Oct. 12, 1948.  T. C. PEW  2,451,115
PILLOW BLOCK BEARING
Filed Feb. 5, 1945
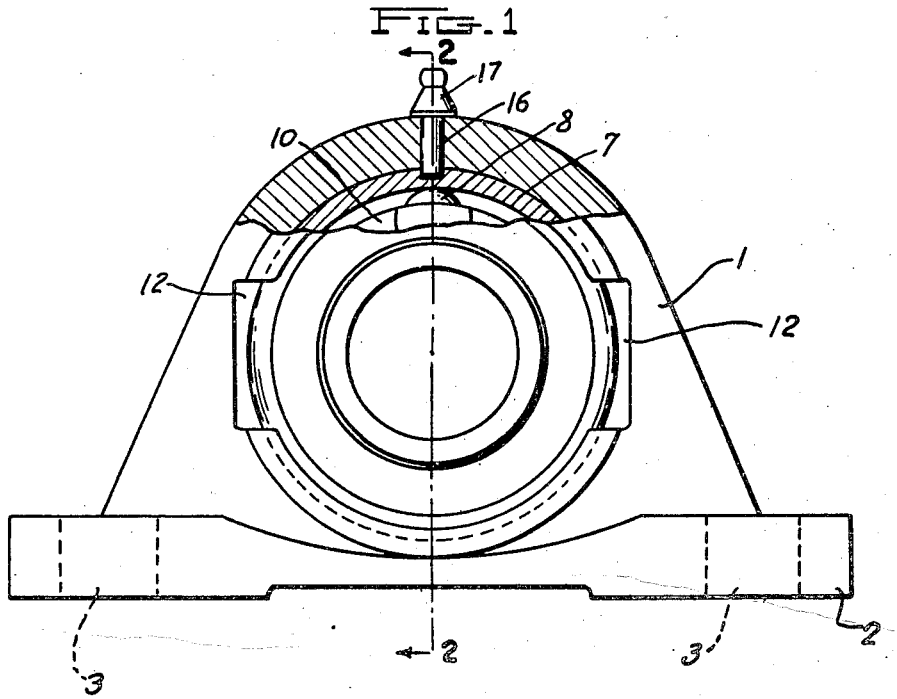
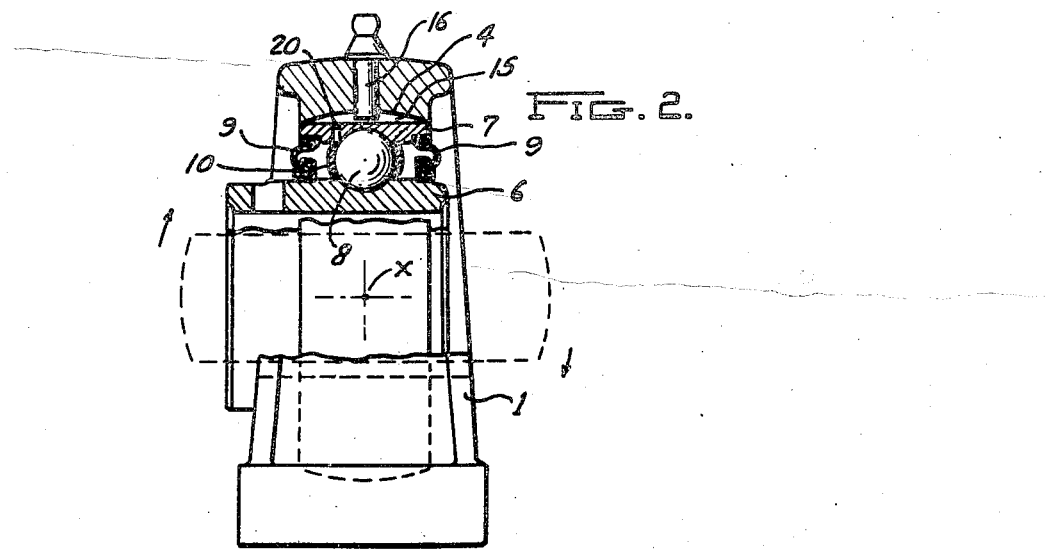
INVENTOR.
Thomas C. Pew Patented Oct. 12, 1948

2,451,115

UNITED STATES PATENT OFFICE 2,451,115

PILLOW BLOCK BEARING

Thomas C. Pew, Ann Arbor, Mich., assignor to Hoover Ball and Bearing Company, Ann Arbor, Mich., a corporation of Michigan Application February 5, 1945, Serial No. 576,207

2 Claims. (Cl. 308—187)

This invention relates to a pillow block bearing and it has to do particularly with a construction wherein an anti-friction bearing is mounted for a limited amount of angular displacement so as to accommodate a shaft or the like where there is a slight misalignment between the shaft and the pillow block.

The general object of the invention is to provide an improved pillow block bearing construction which is simple in design, requires a minimum number of parts, and can be assembled in such a way that a proper operation is assured. To these ends a construction is provided wherein the bearing is lubricated and wherein the bearing may be reversed side for side without disturbing the operative construction. More specifically, the invention has to do with a pillow block bearing of the anti-friction type which includes inner and outer race members with rolling elements therebetween, with improved simplified and novel means for holding the bearing in the pillow block for a limited amount of angular movement and for providing for the lubrication of the bearing.

A pillow block bearing construction made in conformity with the invention is disclosed in the accompanying drawings:

Fig. 1 is a view partly in elevation and with parts cut away showing some of the elements in cross section.

Fig. 2 is substantially a sectional view taken on line 2—2 of Fig. 1.

In Fig. 1 the so-called pillow block is represented at 1 and it has a base 2 designed to be suitably mounted as by means of cap screws or bolts passing through apertures 3 and threaded into or bolted to an underlying support which may constitute a part of the machine in question. This pillow block bearing is formed with an internal seat for the reception of an anti-friction bearing. This seat as shown in Fig. 2 comprises an internal surface formed as an interior surface of a section of a sphere as illustrated at 4.

The anti-friction bearing includes an inner race member 6 and an outer race member 7 with anti-friction elements such as balls 8 disposed therebetween. The bearing may be a self-contained unit provided with suitable sealing means for enclosing the balls. Such a sealing means is illustrated at 9, there being one on each side of the balls in the form of the bearing shown. This construction confines the balls within a closed space or chamber between the races, serves to keep out dirt and other extraneous matter and serves to confine the lubricant. The balls are preferably disposed in a suitable cage 10. Inso- far as the particular seal is concerned, and the cage is concerned, these may vary in construction. The exterior surface of the outer race is also formed as a segment of a sphere so that it fits ball and socket fashion in the internal partially spherical seat 4 of the pillow block.

In order to assemble the anti-friction bearing in the pillow block, the pillow block is provided with diametrically opposite notches or ways 12, the distance across which is at least equal to the maximum diameter of the outer race. The bearing assembly is positioned at right angles to its normal position as shown by the dotted lines in Fig. 2 and passed in between the notches. When the bearing is on center line it may be rocked about 90°, as shown by the arrows in Fig 2, and thus the outer race is positioned in its seat.

The inner race 6 is adapted to receive a suitable shaft or stud and minor matters of disalignment are accommodated by the oscillation of the outer race in its seat 4, this oscillation being of the universal type as will readily be appreciated.

It is, of course, desirable to prevent the outer race from rotating in its seat and it is also desirable to provide for the lubricating of the anti-friction elements. A simple expedient is provided by the invention to accomplish these purposes. There is a slot 15 which is milled or otherwise formed transversely across the outer bearing, this slot opening through the outer arcuate face of the outer race. The depth of the slot may be such that its bottom substantially constitutes a chord across the arc, and the bottom of the slot may be straight as indicated. The depth of the slot should be such that the ends of the slot are closed by a pillow block. Thus the slot forms a closed chamber. A key 16 is disposed in the pillow block and the end thereof projects into the slot 15. This key is on the center line of the bearing as indicated in Fig. 2. The key 16 is preferably the stem part of a lubricant fitting 17 so that the one element serves the two purposes of providing a key or lock and lubricating means. The outer race is provided with a port 20 formed off center relative to the rolling elements. The end of the key 16 is spaced from the bottom of the slot as indicated, so that lubricant which is forced in through the fitting passes into the slot 15 and then through the port 20 into the chamber for the rolling elements.

As will be seen by reference to Fig. 1, the key 16 fits fairly snugly in the slot 15 and prevents rotation of the race 7 on the axis of the bearing in the pillow block. However, since the end of the key is spaced from the bottom of the slot the race 7, and in fact the entire bearing assembly, may oscillate within the pillow block around the center marked x. For normal purposes, there is an adequate movement for accommodating misalignment between the shaft and the pillow block. However, once the assembly is made the key limits the movement of the outer race as the bottom of the slot 15 strikes the end of the key. This prevents the bearing from turning to the dotted line position, shown in Fig. 2, in which position it may be entirely removed from the pillow block. The construction provides for the mounting of the anti-friction bearing in opposite positions. In other words, the anti-friction bearing may be reversed side for side. As noted in Fig. 2, the inner race extends laterally to the left more than it does to the right and the bearing may be reversed so that the inner race extension projects to the right. This is because the key is on the center line and because the slot 15 extends completely across the outer race. The lateral displacement of the port 20 removes it from a location where it would be in contact with the rolling elements.

I claim:

1. In a pillow block bearing, a pillow block having an internal circumferential seat, the surface of the seat being concave and formed as a segment of a sphere, an anti-friction bearing having an outer race and an inner race with rolling elements therebetween, the inner race adapted to receive a shaft or the like, the exterior surface of the outer race being convex and formed as a segment of a sphere and seating in the internal seat of the pillow block whereby the bearing may rock relative to the pillow block to accommodate for misalignment between the shaft and the pillow block, the outer race having a cross slot therein, a lubricant fitting in the pillow block positioned substantially on the center line of the bearing and extending into the cross slot, the end of the fitting being spaced from the bottom of the slot whereby the bearing may oscillate, and a port in the outer race connecting the slot and the chamber for the rolling elements, said port being positioned off center relative to the rolling elements.

2. In a pillow block bearing, a pillow block having an internal circumferential seat, the surface of the seat being concave and formed as a segment of a sphere, an anti-friction bearing having an outer race and an inner race with rolling elements therebetween, the inner race adapted to receive a shaft or the like, the exterior surface of the outer race being convex and formed as a segment of a sphere and seating in the internal seat of the pillow block whereby the bearing may rock relative to the pillow block to accommodate for misalignment between the shaft and the pillow block, the outer race having a crosswise extending slot in its outer surface, the depth of which is such that the bottom of the slot lies substantially on the chord of the arc of curvature of the outer race, said slot being closed by the pillow block, a lubricant fitting extending through the pillow block substantially on the center line of the bearing, the inner end of the fitting extending into the slot and spaced from the bottom of the slot whereby the outer race is keyed to the pillow block and the bearing may rock within limits as determined by the position of the inner end of the fitting, and a port in the outer race connecting the slot and the chamber for the rolling elements and positioned off center relative to the rolling elements.

THOMAS C. PEW.

REFERENCES CITED

The following references are of record in the file of this patent:

UNITED STATES PATENTS

| Number | Name | Date |
| --- | --- | --- |
| 1,792,645 | Larsh | Feb. 17, 1931 |
| 1,978,484 | Auflero | Oct. 30, 1934 |
| 2,194,328 | Shafer | Mar. 19, 1940 |